United States Patent
Zhang et al.

(10) Patent No.: US 11,930,196 B2
(45) Date of Patent: Mar. 12, 2024

(54) REUSE OF BLOCK TREE PATTERN IN VIDEO COMPRESSION

(71) Applicant: HULU, LLC, Santa Monica, CA (US)

(72) Inventors: Wenhao Zhang, Beijing (CN); Deliang Fu, Beijing (CN); Min Gao, Beijing (CN); Juncheng Ma, Beijing (CN); Chen Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 18/164,353

(22) Filed: Feb. 3, 2023

(65) Prior Publication Data

US 2023/0179782 A1    Jun. 8, 2023

Related U.S. Application Data

(63) Continuation of application No. 16/370,117, filed on Mar. 29, 2019, now Pat. No. 11,601,660.

(60) Provisional application No. 62/650,842, filed on Mar. 30, 2018.

(51) Int. Cl.
  *H04N 19/40* (2014.01)
  *H04N 19/46* (2014.01)
  *H04N 19/96* (2014.01)

(52) U.S. Cl.
  CPC .............. *H04N 19/40* (2014.11); *H04N 19/46* (2014.11); *H04N 19/96* (2014.11)

(58) Field of Classification Search
  CPC .............................. H04N 19/96; H04N 19/40
  See application file for complete search history.

(56) References Cited

U.S. PATENT DOCUMENTS

| | | |
|---|---|---|
| 5,446,806 A | 8/1995 | Ran et al. |
| 9,124,289 B2 | 9/2015 | Takamura et al. |
| 2010/0166056 A1 | 7/2010 | Perlman et al. |
| 2012/0134426 A1 | 5/2012 | Sole et al. |
| 2013/0034157 A1 | 2/2013 | Helle et al. |
| 2013/0094589 A1 | 4/2013 | Rosewarne |

(Continued)

FOREIGN PATENT DOCUMENTS

EP    3777148 A1    2/2021

OTHER PUBLICATIONS

Bross et al.: "Versatile Video Coding (Draft 4)"; Joint Video Experts Team (JVET) of ITU-T SG 16 WP 3 and ISO/IEC JTC 1/SC 29/WG 11; 13th Meeting: Marrakech, MA, Jan. 9-18, 2020.

(Continued)

*Primary Examiner* — Jayanti K Patel
*Assistant Examiner* — Christopher Kingsbury Glover
(74) *Attorney, Agent, or Firm* — Kwan & Olynick LLP

(57) ABSTRACT

A method includes transcoding a first block from a spatial region. The first block is associated with a first block tree pattern defining a structure of splitting a block into smaller blocks. A bit string of bits for the first block tree pattern is included in an encoded bitstream. The method determines a location of the first block in the spatial region when the first block tree pattern of the first block can be reused for a second block tree pattern of a second block. The spatial region includes blocks and the location is based on the first block being in the spatial region. Information for the second block is included in the encoded bitstream that indicates the location of the first block in the spatial region. The location allows the bit string for the first block tree pattern to be retrieved for use to decode the second block.

20 Claims, 18 Drawing Sheets

(56) References Cited

U.S. PATENT DOCUMENTS

| 2016/0007050 A1 | 1/2016 | Rusert et al. |
| 2016/0044314 A1 | 2/2016 | Rinaldi |
| 2016/0323594 A1 | 11/2016 | Sun et al. |
| 2017/0159901 A1 | 6/2017 | Li |
| 2018/0077417 A1 | 3/2018 | Huang |
| 2019/0014337 A1 | 1/2019 | Skupin et al. |
| 2019/0130630 A1 | 5/2019 | Ackerson et al. |
| 2020/0374566 A1 | 11/2020 | Sugio et al. |

OTHER PUBLICATIONS

European Extended Search Report, European Patent Application No. EP19776969.8 dated Dec. 8, 2021, 10 pages.
International Search Report & Written Opinion for PCT Application PCT/US2019/025038 (118-26302WO) dated Aug. 12, 2019, 13 pages.
Sina Tamanna, "Transcoding H.265/HEVC Video", 76 pages (2013).

| | |
|---|---|
| decode_root_block() { | |
| reuse_previous_tree_flag | Flag equal to 0 or 1 |
| if ( reuse_previous_tree_flag == 1 ) { | |
| location_of_previous_tree | Location of block tree pattern |
| rotation_of_previous_tree | Rotation degrees |
| flip_of_previous_tree | Flip horizontally or vertically |
| } else | |
| traditional_decode_root_block() | |
| } | |

762 — reuse_previous_tree_flag
764 — if line
766 — location_of_previous_tree
768 — rotation_of_previous_tree
769 — flip_of_previous_tree
770 — traditional_decode_root_block()

FIG. 7C

| | |
|---|---|
| `decode_root_block() {` | |
|   `reuse_previous_tree_flag` | Flag equal to 0 or 1 |
|   `if (reuse_previous_tree_flag == 1) {` | |
|     `location_of_previous_tree` | Where to copy the tree |
|     `num_of_patch` | Number of patches |
|     `for (i=0;i<num_patch;i++) {` | |
|       `patch_starting_index` | Where to apply patch |
|       `patch_type` | Patch type: split or merge |
|       `if (patch_type== 0) // split` | |
|         `patch_split_flags` | How to split current node |
|       `else // merge` | |
|         `patch_merge_depth` | How to merge current nodes |
|     `}` | |
|   `} else` | |
|     ... | |

FIG. 9C

- Merging example
  - Patch #1: split a existing leaf node
    - patch_starting_index = 0
    - patch_type = 0 (split)
    - patch_split_flags = (1)00010000
  - Patch #2: merge leaf nodes into a new leaf node
    - patch_starting_index = 15
    - patch_type = 1 (merge)
    - patch_merge_depth = 1
      - Depth = 0 indicates 15 to 18
      - Depth = 1 indicates 15 to 21

REUSE OF BLOCK TREE PATTERN IN VIDEO COMPRESSION

CROSS REFERENCE TO RELATED APPLICATIONS

This application is a continuation application and, pursuant to 35 U.S.C. § 120, is entitled to and claims the benefit of earlier filed application U.S. application Ser. No. 16/370,117, filed Mar. 29, 2019, entitled "REUSE OF BLOCK TREE PATTERN IN VIDEO COMPRESSION", which is entitled to and claims the benefit of the filing date of U.S. Provisional App. No. 62/650,842 filed Mar. 30, 2018, the content of which is incorporated herein by reference in its entirety for all purposes.

BACKGROUND

A video transcoder transcodes and decodes video based on block tree patterns of blocks. FIG. 1 depicts an example of a frame 100 of the video that is divided into root blocks 102. As shown, frame 100 includes forty root blocks 102-1 to 102-N; however, a different number of root blocks may be used. The video transcoder splits each root block 102 into leaf blocks 104. A block tree pattern may describe how the root block is split. That is, the block tree pattern may include more branches that split a root block into more blocks. Some blocks are split into smaller blocks based on the content of the video. For example, the larger leaf blocks cover flat regions in the video that do not include complex information (e.g., an area that includes a single color) and the smaller leaf blocks cover more complex regions in the video (e.g., an area that includes a person's face). The smaller leaf blocks are used to convey the more complex information while flat regions include mostly the same information and can be compressed using a larger block size.

The transcoder generates a bit string of bits to represent the block tree pattern of how the root block is split into leaf blocks. A large and complex block tree pattern requires a large number of bits to represent the block tree pattern, which need to be transmitted from a transcoder to the decoder. FIG. 2 depicts an example of a bit string of bits 204 that needs to be transmitted for a block tree pattern. The transcoder decides on the block tree pattern at 201. A tree structure that represents the block tree pattern is shown at 202. This tree structure represents how larger blocks are split into smaller blocks from the root block. Each split divides a respective block into four smaller blocks. The transcoder then generates a bit string of bits 204 to represent the block tree pattern, and sends the bits in the bitstream for decoding by the decoder. The number of bits depend on the level of splitting that occurs. That is, if the root block is split into a large number of smaller blocks, then more bits are needed to represent the block tree pattern. The more bits that are included in the bitstream, the greater the overhead of the transcoding.

BRIEF DESCRIPTION OF THE DRAWINGS

FIG. 7C depicts an example of software code to reuse altered block tree patterns according to some embodiments.

FIG. 9C depicts an example of software code to process patches according to some embodiments.

DETAILED DESCRIPTION

Described herein are techniques for a video compression system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments reduce the number of bits to signal a block tree pattern that is used to split a root block into leaf blocks. A transcoder may determine how to split a root block into leaf blocks. The transcoder can determine a bit string of bits that represent the split. However, instead of including the entire bit string of bits in the encoded bitstream, the transcoder searches previously used block tree patterns to determine whether there is a block tree pattern that can be reused for the current block tree pattern being currently encoded. If there is a similar block tree pattern, then the transcoder may reuse the similar block tree pattern. For example, the transcoder can signal to the decoder that the similar block tree pattern is being used for the root block. The transcoder had previously signaled the bits for the previously used block tree pattern. Then, the transcoder does not need to include all the bits describing the current block tree pattern in the encoded bitstream. For example, the transcoder may not need to include any bits from the bit string of bits. Rather, the transcoder may insert a flag into the encoded bitstream that indicates the block tree pattern is being reused. The transcoder may also include an identifier for the root block in which the similar block tree pattern was used.

The decoder may use the flag to determine that the root block is split similarly to the block tree pattern of the previously decoded root block using the previously sent block tree pattern. The decoder retrieves the bit string for the block tree pattern of the previous decoded root block and uses that bit string to decode the current root block. The reuse of the similar block tree pattern reduces the number bits in the encoded bitstream, which improves the compression of the video.

System Overview

Figure 3:
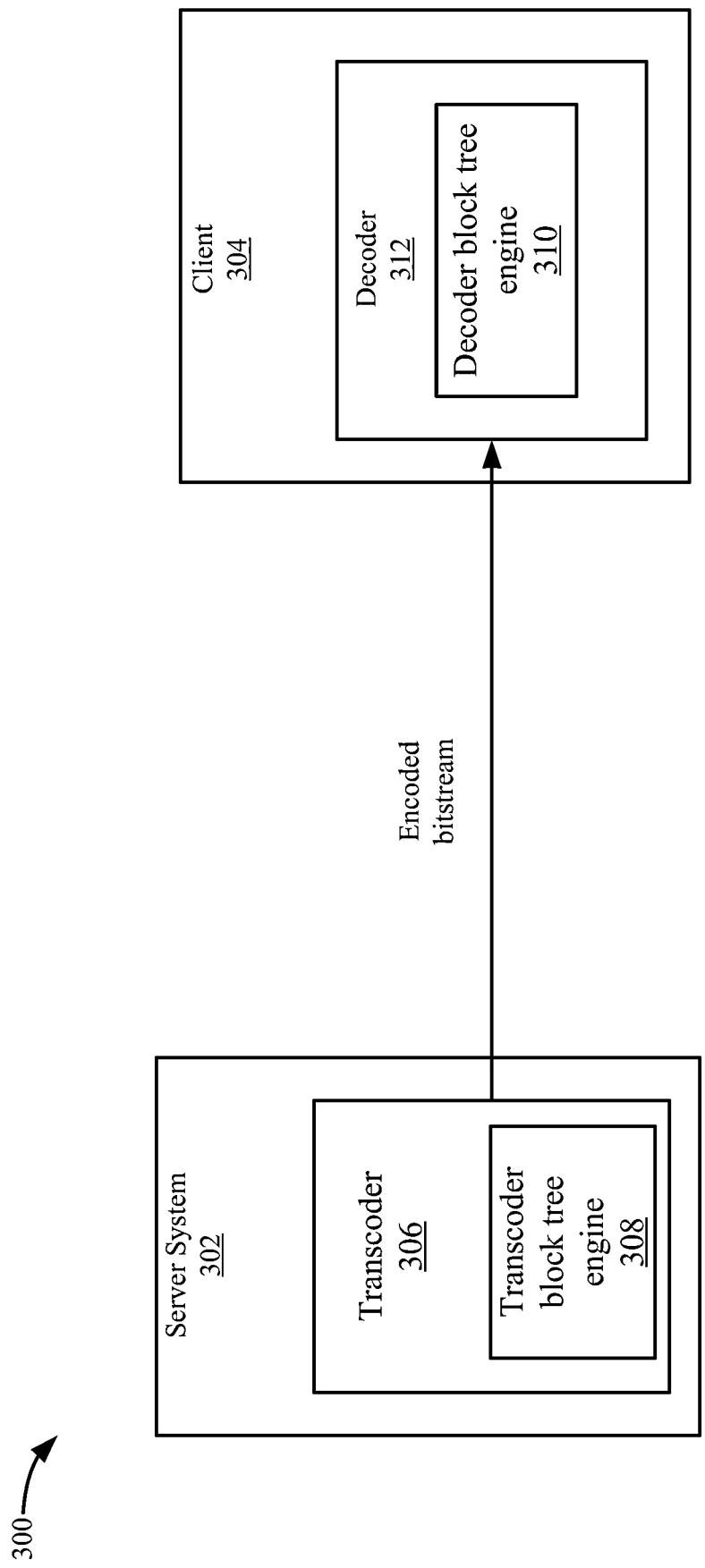
FIG. 3 depicts a simplified system for transcoding and decoding using a block tree pattern according to some embodiments.

FIG. 3 depicts a simplified system 300 for transcoding and decoding using a block tree pattern according to some embodiments. System 300 transcodes a source video asset, which may be any type of video, such as for a television show, movie, or video clip. The source video may need to be transcoded into one or more formats, such as one or more bitrates. In some embodiments, a server system 302 sends an encoded bitstream to client 304. For example, server system 302 may be sending a video to a client 304 for playback.

Server system 302 includes a transcoder 306 that transcodes video into an encoded bitstream. Transcoder 306 may be a software video processor/transcoder configured on a central processing unit (CPU), a hardware accelerated video processor/transcoder with a graphical processing unit (GPU), a field programmable gate array (FPGA), and/or a hardware processor/transcoder implemented in an application-specific integrated circuit (ASIC). Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

During the transcoding, a transcoder block tree engine 308 splits each root block into leaf blocks as described above. Transcoder block tree engine 308 generates a bit string of bits that represent the block tree pattern. For example, at 204 in FIG. 2, a block tree pattern split string of bits is used to describe the block tree pattern at 201. The bits may be flags or other information (e.g., characters) that describe the block tree pattern, such as a value of "1" indicates a split of the current block and a value of "0" indicates a leaf block is reached. A leaf block is when the block is not split any further. In this example, quad-tree splitting is performed, which splits a block into four smaller blocks. However, a block may be split into other numbers of blocks using a triple-tree splitting structure (e.g., a block is split into three smaller blocks), or a binary-tree splitting structure (e.g., a block is split into two smaller blocks). Also, the shape of the blocks may also differ, such as a block is split into rectangular or square blocks. Transcoder 306 may communicate the different types of splitting structures and blocks to decoder 312. The more complicated the pattern, the more bits that are needed to communicate the structure of the block tree pattern.

Figure 1:
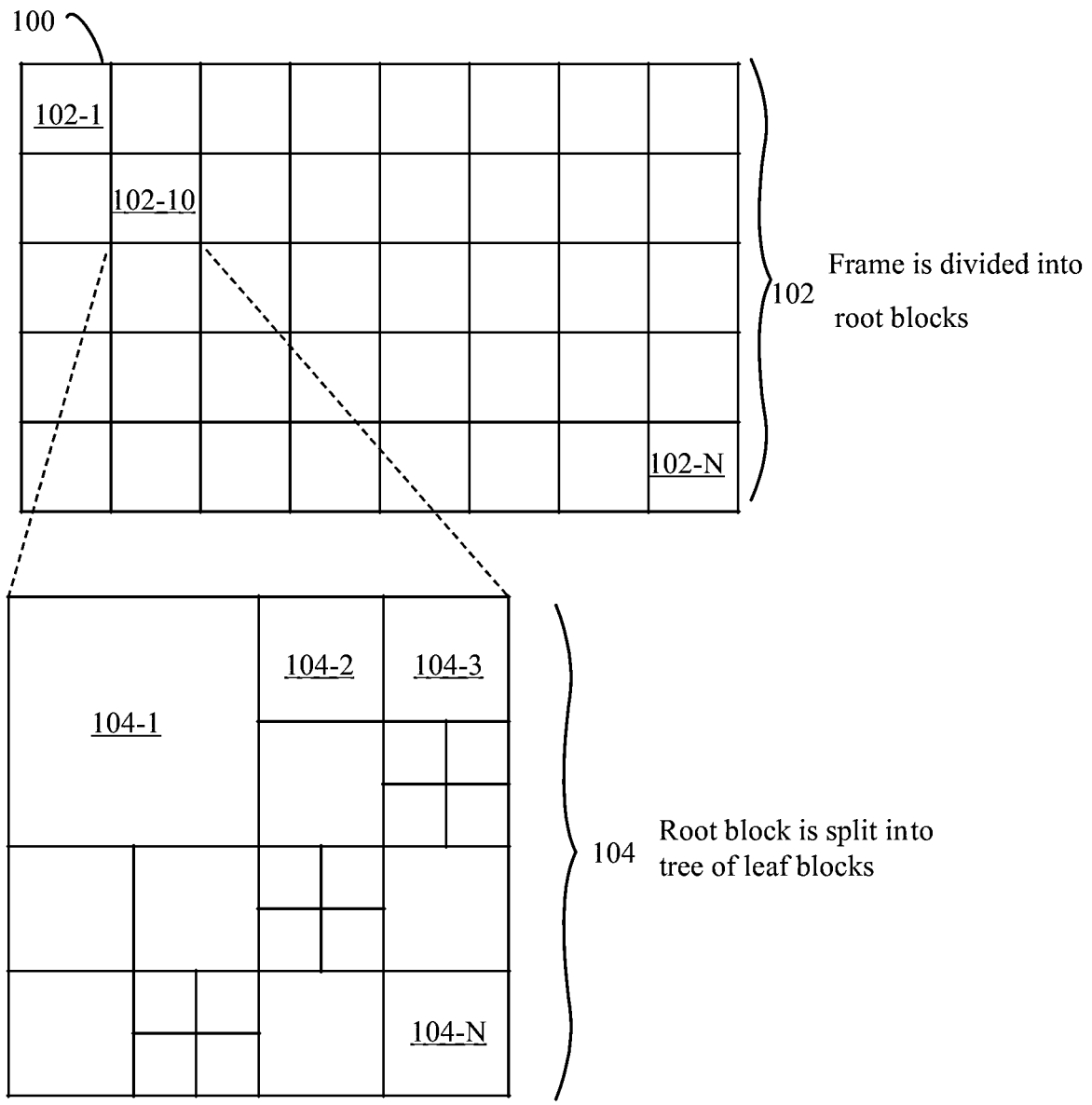
FIG. 1 depicts an example of a frame.
Figure 2:
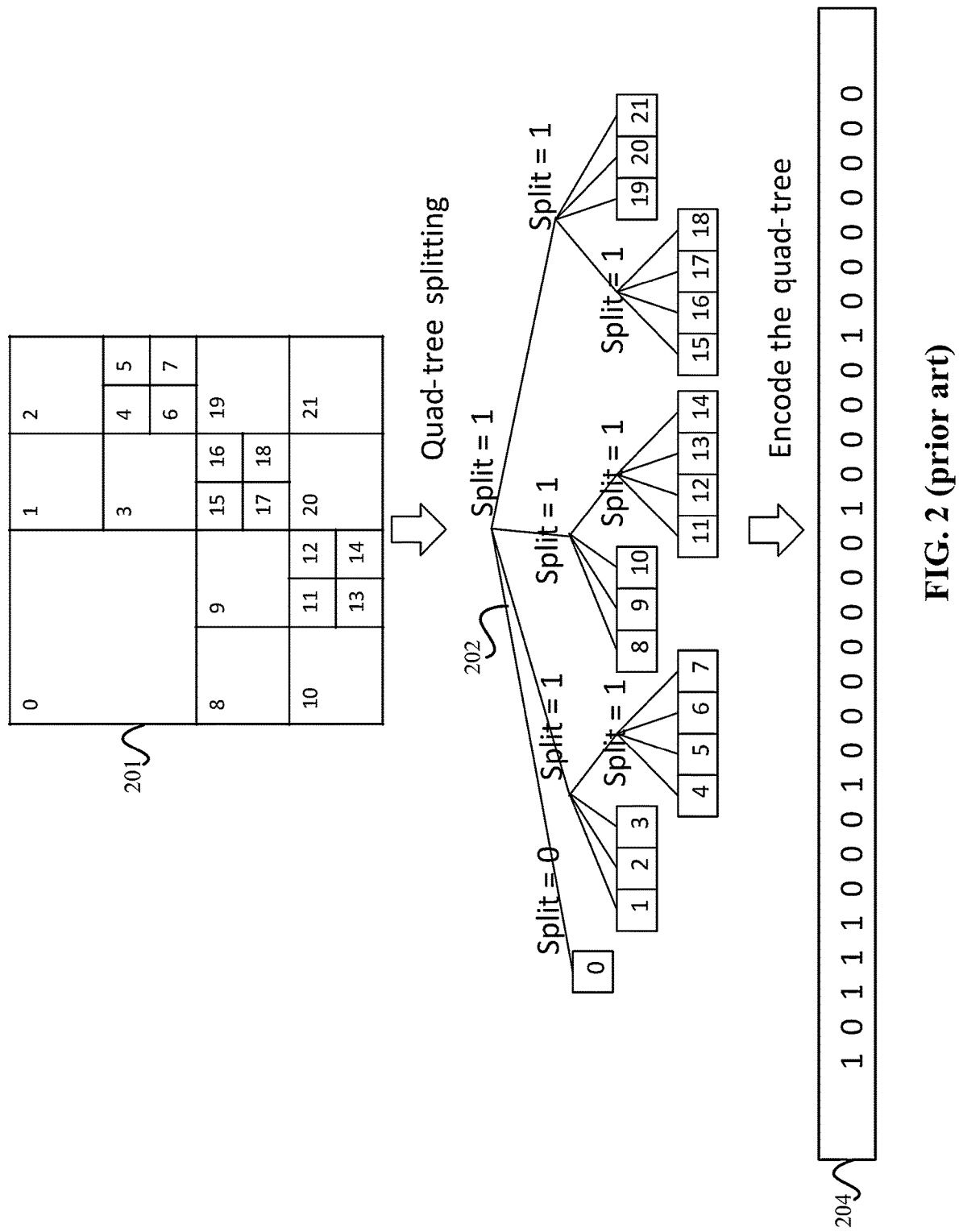
FIG. 2 depicts an example of a bit string of bits that needs to be transmitted for a block tree pattern.

In the quad-tree split pattern in FIG. 2 the root block is split and a value of "1" indicates a split of a block into four blocks and a value of "0" indicates a leaf block has been reached. In the bit string at 204, the first bit of "1" splits the root block into four blocks. The next four bits of "0111" indicate the splitting of the first level of the quad-tree. The value of "0" indicates block 0 is a leaf block. The next four bits of "0001" indicate blocks 1, 2, and 3 are leaf blocks, and then there is a split. Then the next four bits of "0000" indicate blocks 4, 5, 6, and 7 are leaf blocks. The next four bits of "0001" indicate blocks 8, 9, and 10 are leaf blocks and then there is a split. Then the next four bits of "0000" indicate blocks 11, 12, 13, and 14 are leaf blocks. Then the next four bits of "1000" indicate that there is a split and then blocks 19, 20, and 21 are leaf blocks. The next four bits of "0000" indicate blocks 15, 16, 17, and 18 are leaf blocks. Although this method of signaling the block tree pattern is described, other methods may be used. These flags are generated according to the block patterns by transcoder 306 and transmitted to decoder 312 via the encoded bitstream. Decoder 312 receives and translates these flags into the block tree patterns, which are exactly identical to the transcoder's block tree patterns.

Transcoder block tree engine 308 may generate the bit string for the block tree pattern the first time a pattern is encountered. Transcoder 306 then signals the bit string to decoder 312 in the encoded bitstream. There may be times when the block tree pattern can be reused. For example, transcoder block tree engine 308 may determine that the current block tree pattern for a current root block matches a previously encountered block tree pattern from another root block. Also, it is possible that the block tree patterns may not exactly match, but may still be reused. Transcoder block tree engine 308 may also reuse the block tree pattern when the block tree patterns do not exactly match, which will be described in more detail below. Block tree patterns may be similar when a first block tree pattern can be reused for a second block tree pattern. When reusing a block tree pattern, transcoder block tree engine 308 inserts a flag in the encoded bitstream to signal when to reuse a block tree pattern. The flag may indicate a location of the root block that includes the same block tree pattern or other information may be included in the encoded bitstream to indicate the location of the root block that includes the same block tree pattern.

Transcoder 306 sends the encoded bitstream for the video to decoder 312. The encoded bitstream includes the bits for the block tree patterns and also flags that indicate block tree patterns that are reused. Client 304 receives the encoded bitstream and decoder 312 then decodes the encoded bitstream. To decode the bitstream, decoder 312 needs to know how transcoder 306 split each root block. During the decoding, a decoder block tree engine 310 determines the block tree patterns that were used to encode the root blocks. Also, decoder block tree engine 310 determines when to reuse a block tree pattern based on signaling from transcoder 306. For example, decoder block tree engine 310 determines when a flag for reusing a block tree pattern is encountered. Then, decoder block tree engine 310 determines the block tree pattern, such as by determining the location of the root block that is associated with the block tree pattern to be reused and then retrieving the bit string for the associated block tree pattern for that root block. Decoder 312 uses the bit string to decode the current root block, such as by splitting the root block according to the bit string for the reused block tree pattern.

Block Tree Pattern Reuse

Figure 4:
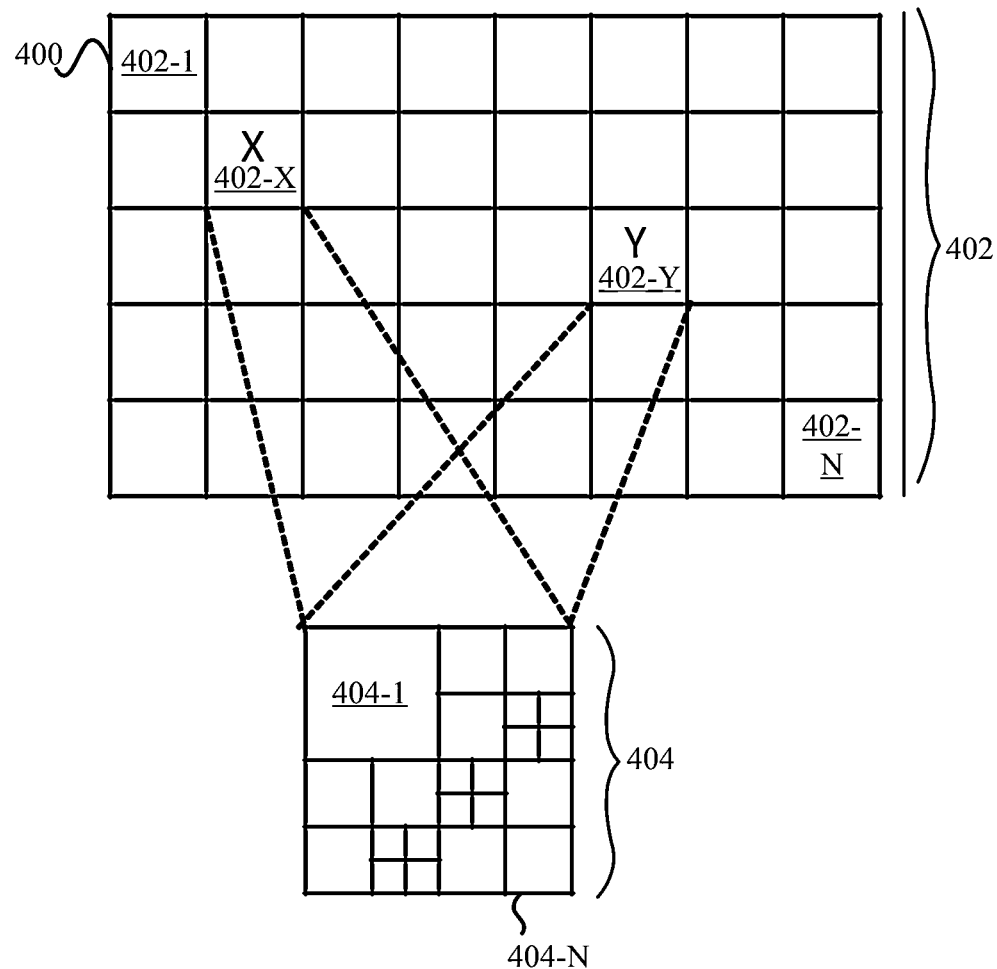
FIG. 4 depicts an example of reusing the block tree pattern according to some embodiments.

FIG. 4 depicts an example of reusing the block tree pattern according to some embodiments. A frame 400 is a picture of video that includes root blocks 402-1 to 402-N. Frame 400 may include forty root blocks 402, but the frame may be divided into different numbers of root blocks. Transcoder 306 may transcode a root block X at 402-X using a block tree pattern. Transcoder 306 encodes block X without any reuse of a block tree pattern. That is, transcoder 306 generates a bit string to represent the block tree pattern and this bit string is included in the encoded bitstream. Transcoder 306 may store the bit string in a storage location to keep a record of the block tree patterns that were already used.

When transcoder 306 encounters a block Y at 402-Y, transcoder 306 performs the splitting of the root block into leaf blocks. Transcoder 306 can then determine that block Y and block X share a similar block tree pattern. For example, transcoder 306 may generate the bit string that represents the block tree pattern. Then, transcoder 306 determines whether the bit string was previously used for another root block. In some examples, transcoder 306 looks at the previously generated bit strings and determines whether the same bit string was stored in the storage. If a bit string exists, then transcoder 306 can determine that block Y is split into smaller leaf blocks in the same block tree pattern as block X. For example, at 404, the block tree pattern for both blocks X and Y is shown. This block tree pattern includes the same types of leaf blocks 404-1 to 404-N.

Transcoder 306 can then insert a flag, which is information that indicates the reuse of a block tree pattern, into the encoded bitstream that is sent to decoder 312. In some embodiments, the flag is a bit that can be the value of "0" or "1", with the value of "0" meaning do not reuse the previous tree block pattern and the value of "1" meaning reuse a previous block tree pattern. Also, transcoder 306 may include the location of block X such that decoder 312 can determine which block tree pattern to use. The location may be an identifier for the root block that includes the block tree pattern to reuse. In other examples, the location may identify a block tree pattern that has been previously sent to decoder 312. In some embodiments, the flag may be one bit to indicate the reuse and X number of bits are used to send the location of the root block that includes the block tree pattern to reuse.

Figure 5A:
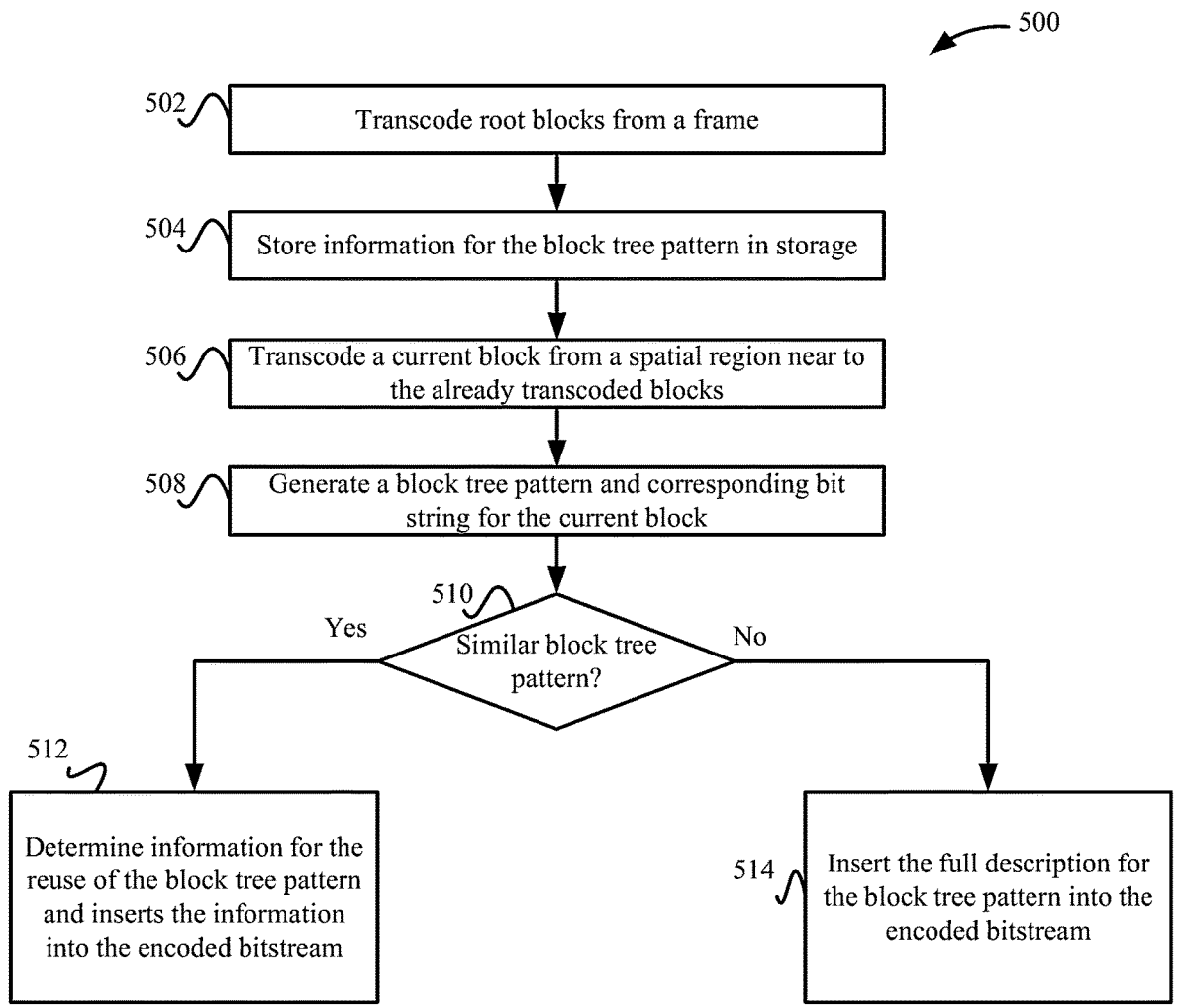
FIG. 5A depicts a simplified flowchart of a method transcoding a root block when reusing block tree patterns according to some embodiments.

FIG. 5A depicts a simplified flowchart 500 of a method transcoding a root block when reusing block tree patterns according to some embodiments. At 502, transcoder 306 transcodes root blocks from a frame. During the transcoding, transcoder 306 generates a block tree pattern for each block. At 504, transcoder 306 stores information for the block tree pattern in storage. For example, transcoder 306 stores the bit string for the block tree pattern.

At 506, transcoder 306 transcodes a current block from a spatial region near to the already transcoded blocks. The spatial region may be in a same frame as the current block being transcoded. However, the spatial region is not limited to the same frame. For example, the spatial region may be in frames other than the current frame being transcoded, such as the X frames from the current frame (e.g., the previous two frames). Also, the spatial region may belong to other layers in a multi-layer video coding or other views in a multi-view video coding. A layer may be part of a sequence of pictures having at least one common characteristic. For example, a layer may include a particular view (e.g., perspective) of multi-view video data. In some examples, a layer may be associated with a particular layer of scalable video data. The terms layer and view may be used interchangeably.

At 508, transcoder 306 generates a block tree pattern and corresponding bit string for the current block. Then, at 510, transcoder 306 determines whether a similar block tree pattern exists. For example, transcoder 306 searches the storage for block tree patterns that can be reused for the current block. The block tree pattern may be the same or may be slightly different. For example, as will be discussed below, a block tree pattern that is slightly different may be rotated or altered to match the current block tree pattern. In some embodiments, the search process may compare a bit string that represents the split of the block for current transcoded block with other bitstrings that represent the split of the previously transcoded blocks. If the bit strings are exactly identical, transcoder 306 determines that the two coding blocks share the same block tree pattern. The parsing and comparing process could be designed to handle the scenarios of block tree pattern rotation/flipping and partial block tree patch, which will be discussed below. For the case of block tree pattern rotation/flipping, a conversion logic can be used to translate a bit string of a block tree pattern into other bit strings, which correspond to rotated versions or flipped versions of the block tree pattern. Searching with rotation/flipping can be applied by comparing the bit string of current transcoded block with the converted bit strings of previously transcoded blocks. For the case of partial block pattern patching, the parsing and comparing logic can be designed to tolerate a certain level of differences between the bit strings that represent the splitting structure. The differences may include but are not limited to largest patch block size, number of patches and etc.

At 512, if a similar block tree pattern is found, transcoder 306 determines information for the reuse of the block tree pattern and inserts the information into the encoded bitstream. For example, reusing the block tree pattern may include transcoder 306 inserting a flag in the encoded bitstream indicating that the block tree pattern from another block is being used for the current block. Also, transcoder 306 may add the location of the block that includes the similar block tree pattern. The location of the previous block may be represented by the root block index inside a frame or by 2-dimensional coordinates of a root block inside a frame. Also, the location of the previous root block may be represented by an index of a look-up table that records previously decoded block tree patterns. At 514, if a similar block tree pattern is not found, transcoder 306 inserts the full description for the block tree pattern into the encoded bitstream.

Figure 5B:
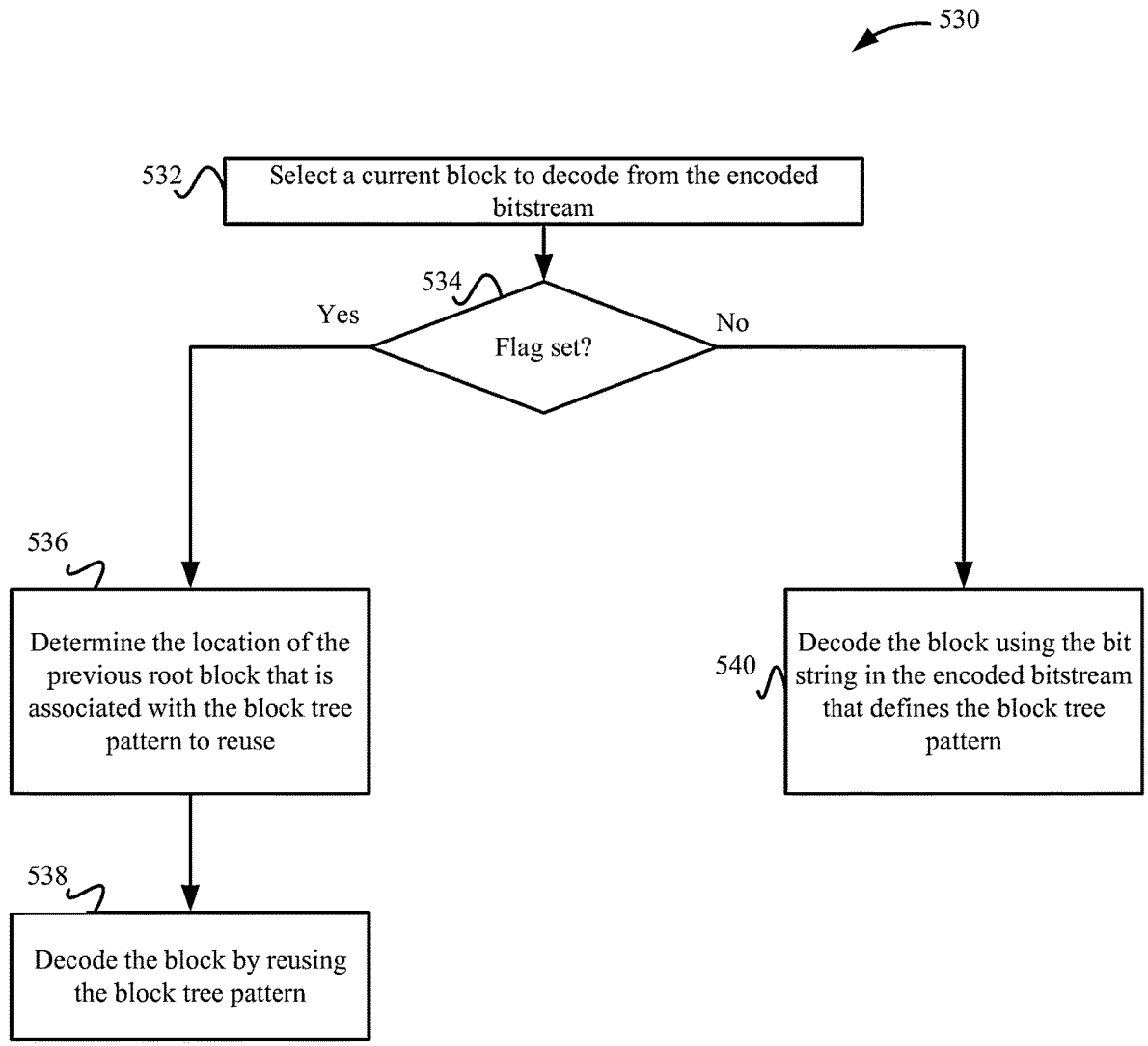
FIG. 5B depicts a simplified flowchart of a method for decoding a block when reusing block tree patterns according to some embodiments.

FIG. 5B depicts a simplified flowchart 530 of a method for decoding a block when reusing block tree patterns according to some embodiments. Decoder 312 receives the encoded bitstream and can decode the bitstream into the video. At 532, decoder 312 selects a current block to decode from the encoded bitstream. At 534, decoder 312 determines if a flag is set that indicates the block tree pattern should be reused. If the flag is set to indicate that the block tree pattern should be reused, then at 536, decoder 312 determines the location of the previous root block that is associated with the block tree pattern to reuse. For example, transcoder 306 may have sent the location of the block that includes the block tree pattern that should be reused in the encoded bitstream. At 538, decoder 312 then decodes the block by reusing the block tree pattern. If, on the other hand, the flag was not set at 534, at 540, decoder 312 decodes the block using the bit string in the encoded bitstream that defines the block tree pattern.

Figure 5C:
FIG. 5C depicts an example of software code to reuse block tree patterns according to some embodiments.

FIG. 5C depicts an example of software code to reuse block tree patterns according to some embodiments. At 552, decoder 312 determines the value of the flag reuse_previous_tree_flag. In some embodiments, the value may be a bit value of "1" to indicate the block tree pattern should be reused or a bit value of "0" to indicate no reuse; however, other values may be used. At 554, if the flag is set to indicate that the block tree pattern should be reused, then at 556, decoder 312 determines the location of the previous block tree. For example, the location is stored in the variable location_of_previous_tree. If, on the other hand, the flag was not set at 554, at 558, decoder 312 decodes the block using the string of bits that defines the block tree pattern. Decoder 312 may use the function tradition_decode_root_block( ) to perform the decoding process that does not reuse the block tree pattern.

Similar Block Tree Patterns

Figure 6:
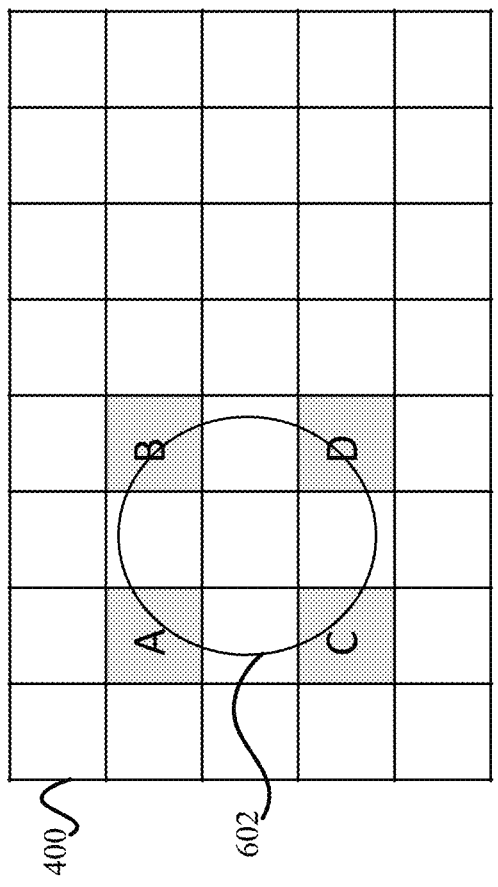
FIG. 6 depicts an example of reusing block tree patterns that are altered according to some embodiments.
Figure 6:
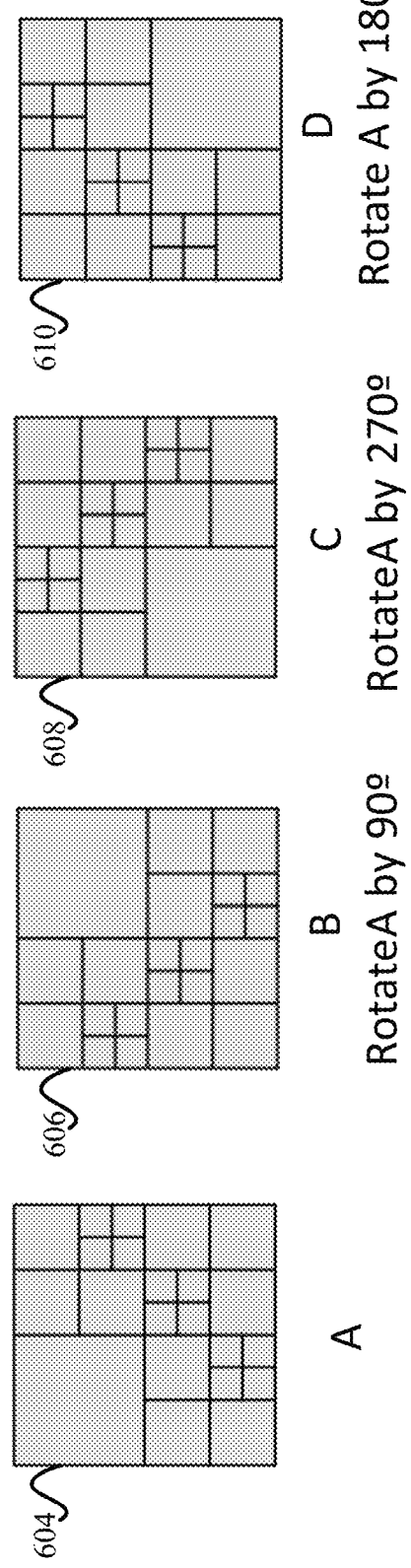

The block tree patterns that are determined between two root blocks may not exactly match, but the reuse of a block tree pattern may nevertheless be possible. For example, some block tree patterns may be similar, but are rotated or flipped from a current block tree pattern. FIG. 6 depicts an example of reusing block tree patterns that are altered according to some embodiments. At 602 in a frame 400, four root blocks A, B, C, and D are shown at different locations. Transcoder 306 may reuse the block tree pattern for root block A when transcoding root blocks B, C, and D. However, root blocks B, C, and D may not have exactly the same block tree pattern. Rather, the block tree pattern for root blocks B, C, and D are rotated from the block tree pattern for root block A.

At 604, the block tree pattern for root block A is shown. At 606, the block tree pattern for root block B is different from the block tree pattern for root block A. However, if transcoder 306 rotates the block tree pattern for root block A by 90 degrees, the block tree pattern for root block A becomes similar to the block tree pattern for root block B. Similarly, if transcoder 306 rotates the block tree pattern for root block A by 270 degrees, the pattern becomes similar to the block tree pattern for root block C at 608. At 610, if transcoder 306 rotates the block tree pattern for root block A by 180 degrees, the pattern becomes similar to the block tree pattern for root block D. In some embodiments, the block tree pattern can be uniquely presented by the split bit string, thus transcoder 306 can translate a given bit string to another bit string corresponding to its rotated version of block tree pattern. Transcoder 306 can analyze the similarity of block tree pattern by comparing the current bit string with the converted bit strings.

Other alterations to the block tree patterns may also be appreciated. For example, transcoder 306 may flip the previous block tree pattern. Flipping the pattern may exchange one half of the block tree pattern with a second half of the block tree pattern. The block tree pattern may be split horizontally or vertically. The exchange may also exchange other portions, such as quarters of the block tree pattern may be rearranged to different positions.

Figure 7A:
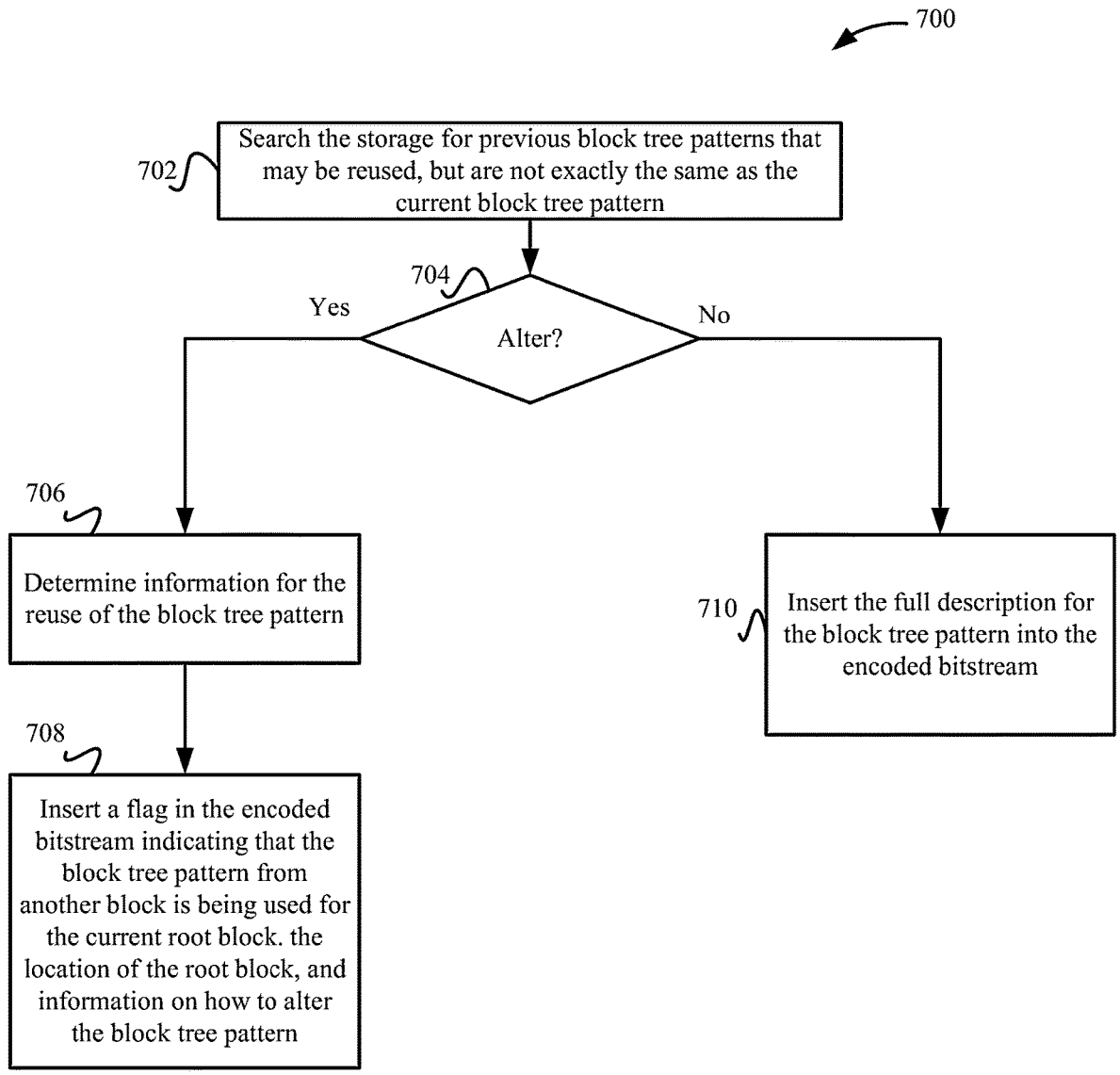
FIG. 7A depicts a simplified flowchart of a method for transcoding a root block when reusing altered block tree patterns according to some embodiments.

FIG. 7A depicts a simplified flowchart 700 of a method for transcoding a root block when reusing altered block tree patterns according to some embodiments. The following assumes that transcoder 306 has transcoded some root blocks and stored the block tree patterns in storage. At 702, transcoder 306 searches the storage for previous block tree patterns that may be reused, but are not exactly the same as the current block tree pattern. The above described use of converted bit strings may be used to determine block tree patterns that are not exactly the same as the current block tree pattern, but may be patched. At 704, transcoder 306 may then determine if the previous block tree pattern can be altered to be the same as the current block tree pattern.

At 706, if a similar block tree pattern is found, transcoder 306 determines information for the alteration of the block tree pattern. Then, at 708, in addition to inserting a flag in the encoded bitstream indicating that the block tree pattern from another block is being used for the current root block and the location of the root block, transcoder 306 may insert information on how to alter the block tree pattern. For example, transcoder 306 may insert information on the rotation degrees or how to flip the block tree pattern. At 710, if a similar block tree pattern is not found, transcoder 306 inserts the full description for the block tree pattern into the encoded bitstream.

Figure 7B:
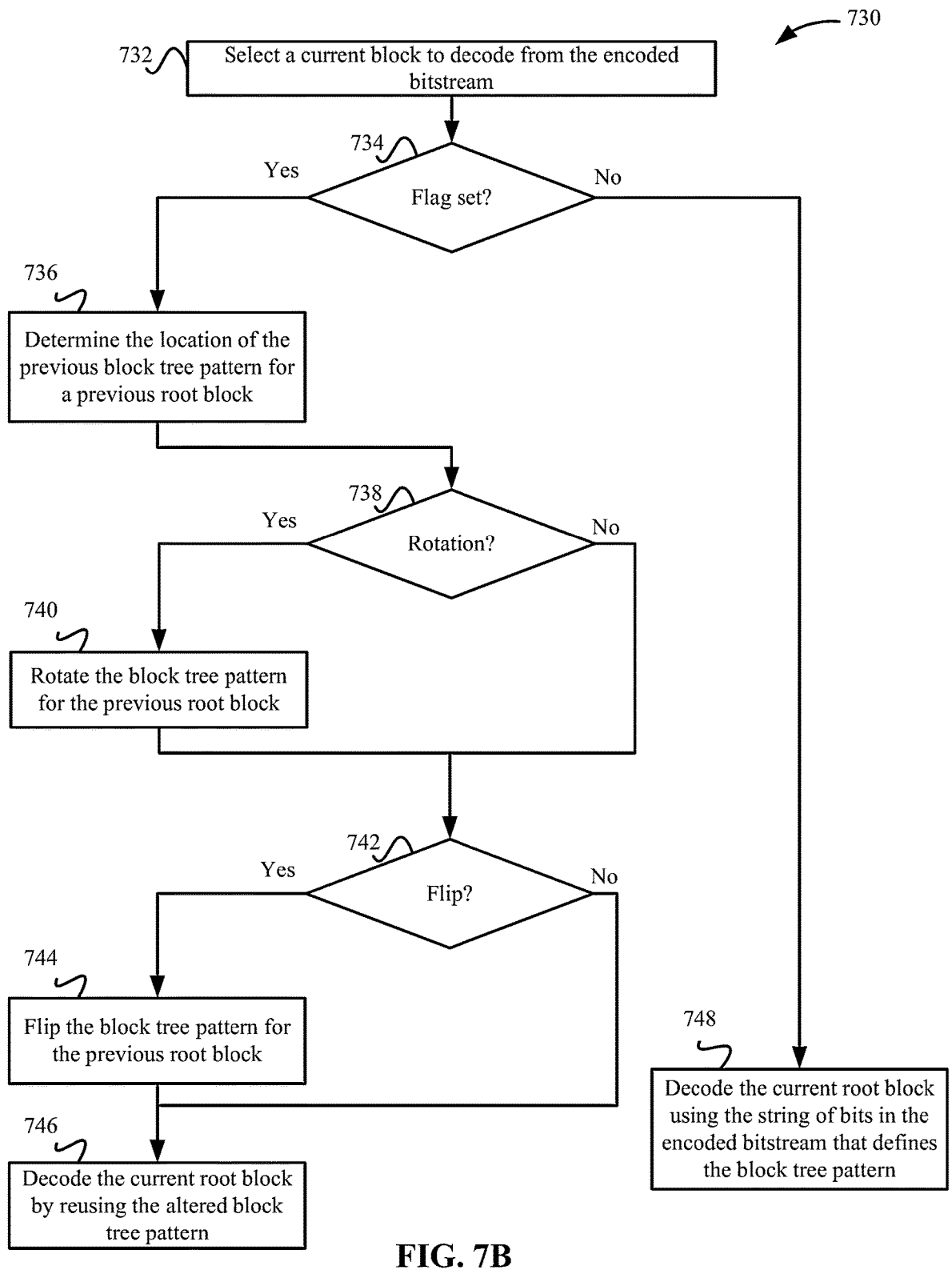
FIG. 7B depicts a simplified flowchart of a method for decoding a block when reusing altered block tree patterns according to some embodiments.

FIG. 7B depicts a simplified flowchart 730 of a method for decoding a block when reusing altered block tree patterns according to some embodiments. At 732, decoder 312 selects a current root block to decode from the encoded bitstream. At 734, decoder 312 determines if a flag is set that indicates a block tree pattern should be reused. If the flag is set to indicate that the block tree pattern should be reused, then at 736, decoder 312 determines the location of the previous block tree pattern for a previous root block. At 738, decoder 312 determines whether rotation of the previous block tree pattern is required. If so, at 740, decoder 312 rotates the block tree pattern for the previous root block. At 742, decoder 312 determines whether flipping of the previous block tree pattern is required. If so, at 744, decoder 312 flips the block tree pattern for the previous root block. It is noted that both rotation and flipping may be performed, or only one of rotation or flipping may be performed. At 746, decoder 312 then decodes the current root block by reusing the altered block tree pattern. If, on the other hand, the flag was not set at 734, at 748, decoder 312 decodes the current root block using the string of bits in the encoded bitstream that defines the block tree pattern.

FIG. 7C depicts an example of software code to reuse altered block tree patterns according to some embodiments. At 762, decoder 312 determines the value of the flag reuse_previous_tree_flag. At 764, if the flag is set to indicate that the block tree pattern should be reused, then at 766, decoder 312 determines the location of the previous block tree. For example, the location is stored in the variable location_of_previous_tree. Then, at 768, decoder 312 determines if transcoder 306 set a parameter for the rotation of the previous block tree. If so, the parameter indicates the rotation degrees, such as 90, 180, and 270 degrees. Then, at 769, decoder 312 determines if transcoder 306 set a parameter for the flipping of the previous block tree. If so, the parameter indicates the flipping direction, such as horizontally or vertically. Decoder 312 then decodes the block by reusing the block tree pattern in conjunction with the parameters, if any, indicating the rotation and flipping direction to be used. Decoder 312 may alter the bit string to represent the rotation and/or flipping.

If the flag was not set at 762, at 770, decoder 312 decodes the block using the string of bits that defines the block tree pattern. Decoder 312 may use the function tradition_decode_root_block( ) to perform the decoding process that does not reuse the block tree pattern.

Some embodiments can also apply patches to block tree patterns. The patches may modify bit values in the bit string that describes the block tree pattern. In this case, the changes may be sent to decoder 312 instead of having to send the whole encoded bit string to describe the block tree pattern. The modification is different from the rotation or flipping of a block tree pattern. The rotation or flipping did not change a value of the bit string describing the block tree pattern; rather, the rotation or flipping rearranged the bits to represent the altered block tree pattern. Applying a patch, however, will change at least one of the values of the bit string for the block tree pattern.

Figure 8:
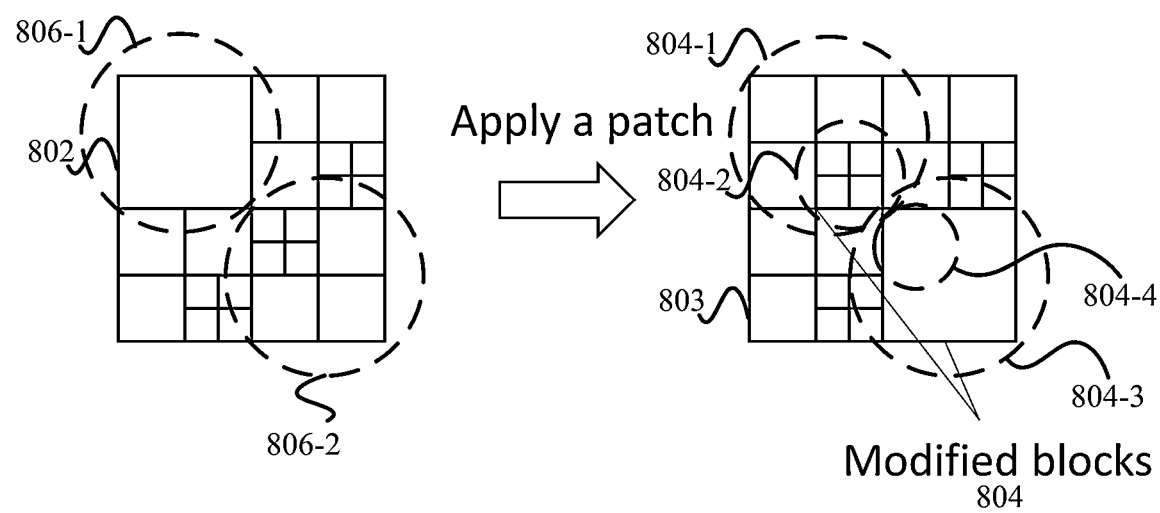
FIG. 8 depicts an example of applying a patch to blocks according to some embodiments.

FIG. 8 depicts an example of applying a patch to blocks according to some embodiments. The patch that is signaled in the encoded bitstream may indicate a type of operation to perform on a block, such as a split or merge. A split may split a block into multiple smaller blocks. A merge may merge smaller blocks into a larger block or blocks. Also, the patch may indicate how to split or merge the prior block tree pattern.

In the example in FIG. 8, transcoder 306 identifies a root block 802 that includes a block tree pattern that can be reused, and determines that the block tree pattern needs to be altered to be more similar to the block tree pattern for a current block being transcoded. The block tree pattern for a root block 803 is the result of applying a patch to root block 802. Specifically, within root block 803, the smaller blocks at 804 have been modified from a block 806-1 in root block 802. The adjustment may split a block further (e.g., add some split operations) or merge blocks that were split (e.g., remove some split operations). In the example of adding split operations, in the block shown at 806-1 in root block 802, no split operations were performed. However, at 804-1, the block has been split twice. At 804-1, the block is split into four blocks. Then, at 804-2, the newly formed block is split into four blocks.

A block 806-2 in root block 802 has been split at two levels. However, a block at 804-3 in root block 803 has not been split. To merge the blocks, at 804-4, the split of the block is removed to merge the four blocks into one block. Also, at 804-3, the four blocks are merged into a single block. This block now matches the block at 806-2.

The search can be performed via parsing and comparing the split bit strings of current root block and the target block. Transcoder 306 can tolerate a certain level of differences between the two block tree patterns. For example, transcoder 306 allows the two block patterns to be different at certain block sizes, and/or allows a maximum number of different blocks of the two block patterns. For these bits need to be changed, transcoder 306 can perform the patches to change the bit string.

Figure 9A:
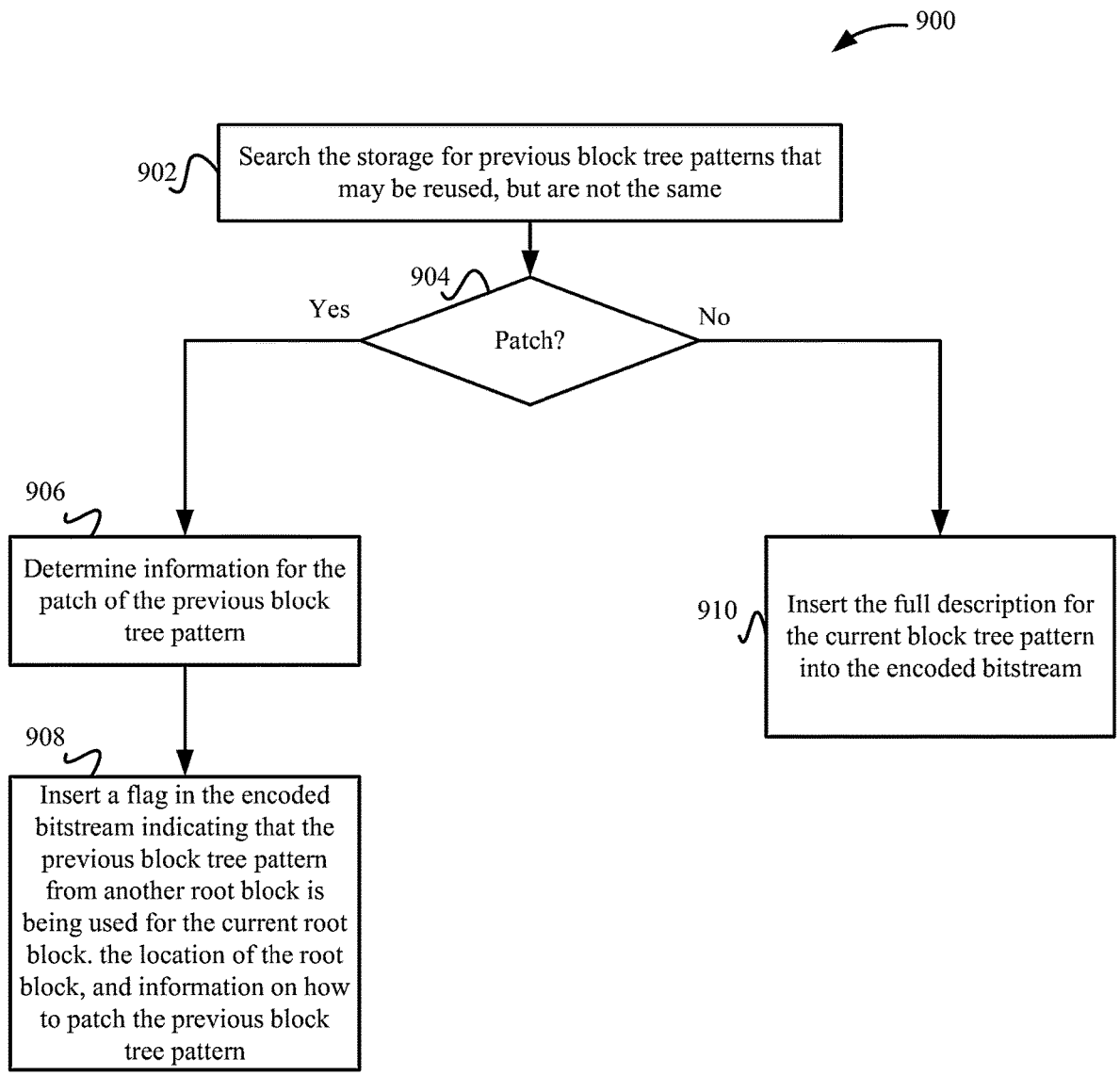
FIG. 9A depicts a simplified flowchart of a method for transcoding a root block when reusing altered block tree patterns according to some embodiments.

FIG. 9A depicts a simplified flowchart 900 of a method for transcoding a root block when reusing altered block tree patterns according to some embodiments. The following assumes that transcoder 306 has transcoded some root blocks and stored the block tree patterns in storage. At 902, transcoder 306 searches the storage for previous block tree patterns that may be reused, but are not the same. When a previous block tree pattern can be reused is found, but is not the same, at 904, transcoder 306 may then determine if the previous block tree pattern can be patched to create a block tree pattern that is the same as the current block tree pattern of the current root block.

At 906, if the previous block tree pattern can be patched, transcoder 306 determines information for the patch of the previous block tree pattern. Then, at 908, in addition to inserting a flag in the encoded bitstream indicating that the previous block tree pattern from another block is being used for the current root block and the location of the root block, transcoder 306 may insert information on how to patch the previous block tree pattern. For example, transcoder 306 may insert information on whether to split or merge blocks of the previous block tree pattern. At 910, if a patch to the previous block tree pattern cannot be used, transcoder 306 inserts the full description for the current block tree pattern into the encoded bitstream.

Figure 9B:
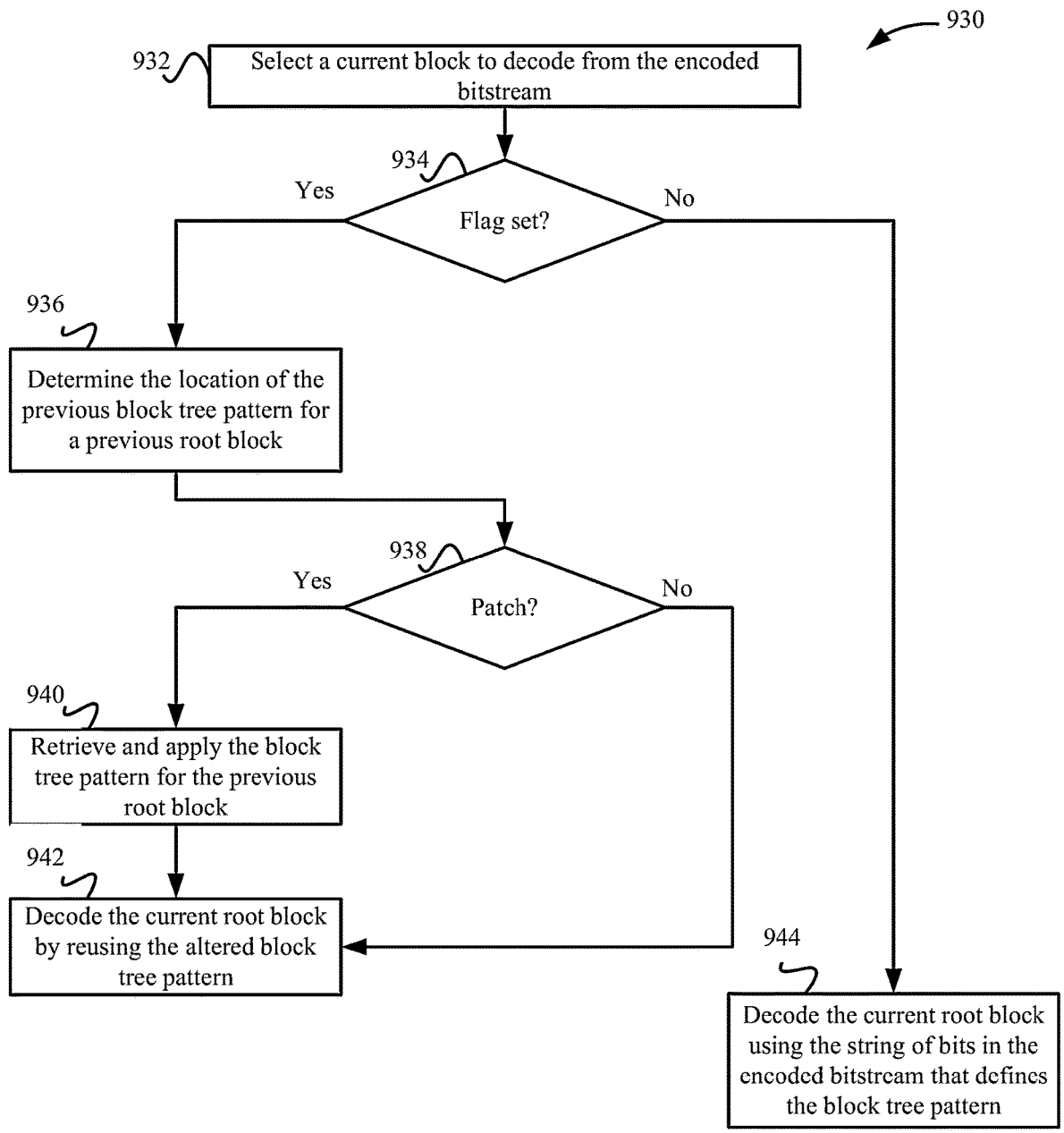
FIG. 9B depicts a simplified flowchart of a method for decoding a block when applying a patch to a previous block tree pattern according to some embodiments.

FIG. 9B depicts a simplified flowchart 930 of a method for decoding a block when applying a patch to a previous block tree pattern according to some embodiments. At 932, decoder 312 selects a current root block to decode from the encoded bitstream. At 934, decoder 312 determines if a flag is set that indicates a previous block tree pattern should be reused. If the flag is set to indicate that the previous block tree pattern should be reused, then at 936, decoder 312 determines the location of the previous block tree pattern for a previous root block. At 938, decoder 312 determines whether a patch of the previous block tree pattern is required. If so, at 940, decoder 312 retrieves and applies the patch to the block tree pattern for the previous root block. If a patch is not applied or after the patch is applied, at 942, decoder 312 then decodes the current root block by reusing the altered block tree pattern. If, on the other hand, the flag was not set at 934, at 944, decoder 312 decodes the current root block using the string of bits in the encoded bitstream that defines the block tree pattern.

FIG. 9C depicts an example of software code to process patches according to some embodiments. At 962, decoder 312 determines the value of the flag reuse_previous_tree_flag. At 964, if the flag is set to indicate that the block tree pattern should be reused, then at 966, decoder 312 determines the location of the previous block tree. For example, the location is stored in the variable location_of_previous_tree. Then, at 968, decoder 312 determines a number of patches that are being applied. For example, transcoder 306 determines how many patches are to be applied to the previous block tree pattern.

At 970, for each of the patches, decoder 312 performs the following process. At 972, decoder 312 determines a patch starting index that indicates where to apply the patch in the block tree pattern. At 974, decoder 312 determines the patch type, such as a split or merge. At 976, if the patch is a split, then decoder 312 determines the value for the split flags patch_split_flags that indicate how to split the blocks. For example, the split flags may indicate how many blocks to split the block into, and the splitting pattern inside the block. At 978, if the patch is a merge, decoder 312 determines a merge depth that describes how to merge the blocks. For example, four blocks with size of N×N may be merged into one larger block with size of 2N×2N, which can be specified by setting the merge depth equal to 0. Merge depth (plus 1) defines the numbers of levels of the merge, so that merge depth equal to 0 specifies a merge that is one level up (e.g., merging four blocks into one larger block).

Figure 10:
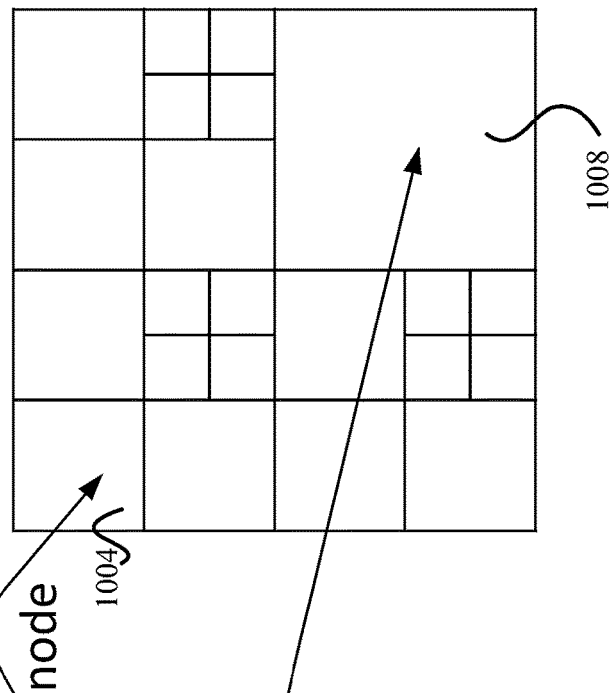
FIG. 10 depicts examples of a split patch and a merge patch according to some embodiments.

FIG. 10 depicts examples of a split patch and a merge patch according to some embodiments. For a split patch, at 1002, the patch starting index is shown as index #0. The blocks may be numbered in sequence starting from block 0, and in this case, the index proceeds to block #21. The number of blocks depends on the block tree pattern.

At 1004, a split type patch is applied to the block at 1002. The bit string pattern of "(1)0001000" indicates that block 0 should be split into four blocks and then the bottom right smaller block is split into four more blocks. The bits correspond to the block identifiers in the quad-tree splitting and may indicate when to perform a split for the blocks. The bit string of (1)00010000 may indicate:

(1) : split the block 0 into four sub-blocks
0: no further split to the 1st sub-block
0: no further split to the 2nd sub-block
0: no further split to the 3rd sub-block
1: split the 4th sub-block (bottom one) into four sub-sub-blocks
0: no further split to the 1st sub-sub-block
0: no further split to the 2nd sub-sub-block
0: no further split to the 3rd sub-sub-block
0: no further split to the 4th sub-sub-block
All leaf nodes have been reached.

Since decoder 312 has received the patch type and knows that this is a split patch, the first split bit "(1)" can be derived and there may be no need to signal this bit. The value of first split bit "(1)" in the string indicates splitting the larger block, which can be omitted because it can be implicitly derived from the split type patch. The bits that are transmitted may be less than the number of bits for signaling the whole block tree pattern because only the patches to parts of the structure are transmitted while a complicated block tree pattern may include a larger number of bits.

For a merge patch, at 1006, the patch starting index is 15, which is block 15. The patch type is a merge and the depth is equal to "1" to obtain the block shown at 1008. The depth indicates how many levels of blocks to merge. For example, a depth of 1 indicates that blocks 15-21 should be merged into one block and a depth of 0 indicates that blocks 15-18 should be merged into one block. Since the depth is 1 in this example, decoder 312 merges blocks 15-21 into one block. The number of bits to signal the merge is reduced because the merge depth is signaled, which may be one bit compared to the multiple bits needed to signal the whole block tree pattern.

Conclusion

Accordingly, some embodiments reuse block tree patterns to improve the coding efficiency. The number of bits sent in an encoded bitstream may be reduced, which increases the compression of a video.

System

Figure 11:
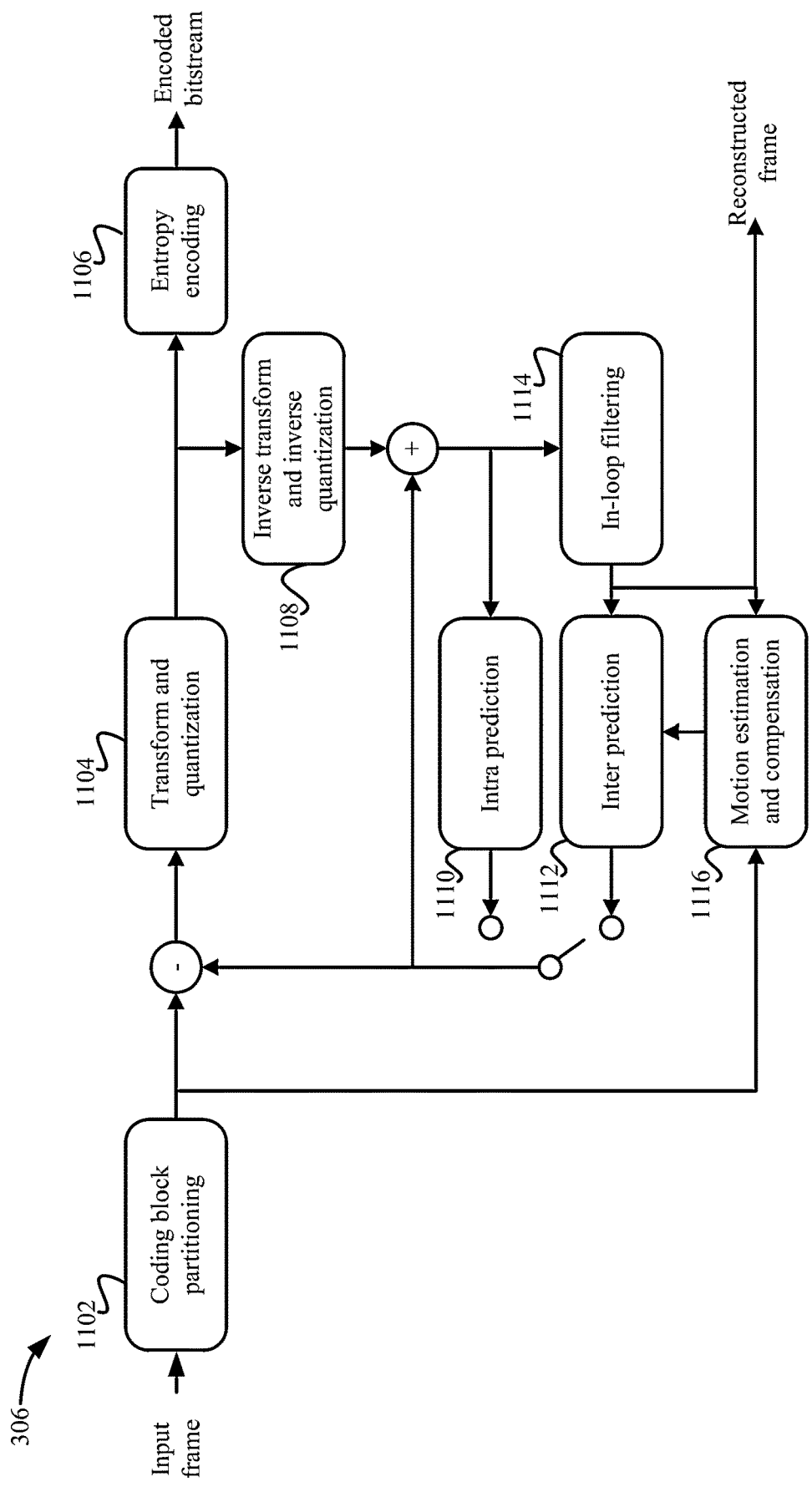
FIG. 11 depicts an example of a transcoding system according to some embodiments.

FIG. 11 depicts an example of a transcoding system according to some embodiments. A video codec framework includes a set of fundamental components: block partitioning, inter and intra prediction, transform and quantization, and entropy coding.

Transcoder 306 receives a frame of a video, which is firstly split into non-overlapping coding blocks for further processing. To cope with different video content characteristics, complex regions will be covered by partitions with smaller sizes, while simple regions will be covered by larger partitions. Multiple block patterns and shapes are may be both used together, for example quad-tree pattern, triple-tree pattern and binary-tree pattern can be all used together, while square blocks and rectangular blocks can also be used together.

Prediction is used to remove the redundancy of a video signal. By subtracting the predicted pixel values from the pixels being processed, the amplitude of a residual signal can be significantly reduced, thus the resulting bitstream size can be reduced. An intra prediction block 1110, which is using reference pixels in the current frame, aims to reduce the spatial redundancy within the frame. An inter prediction block 1112, which is using reference pixels from neighboring frames, attempts to remove the temporal redundancy between frames. a motion estimation and compensation block 1116 may be a sub-module of inter prediction at the transcoder side, which captures the motion trace of objects among adjacent frames and generates reference pixels for inter prediction.

A transform and quantization block 1104 uses the residual pixels after intra or inter prediction. Transform and quantization block 1104 performs a transform operation that represents the residual signal in a frequency domain. Considering the human visual system is more sensitive on low frequency components of video signal than the high frequency components, quantization is designed to further compress the residual signal by reducing the precision on high frequency signals.

To avoid the out-of-sync issue between transcoder 306 and decoder 312, transcoder 306 contains decoding modules to make sure both transcoder 306 and decoder 312 are using identical mathematical processes. Thus, an inverse transform and inverse quantization block 1108 is similar to the same block on the decoder side. Inverse transform and inverse quantization block 1108 reconstructs pixels using the intra and inter prediction.

An in-loop filter 1114 removes any visual artifacts that are introduced by the above-mentioned processes. Various filtering methods are applied on the reconstructed frame in a cascaded way to reduce different artifacts, including but not limited to the blocking artifacts, mosquito artifacts, color banding effects, etc.

An entropy encoding block 1106 may further compress the bitstream using a model-based method. Transcoder 306 transmits the resulting encoded bitstream to decoder 312 over a network or other types of medium.

Figure 12:
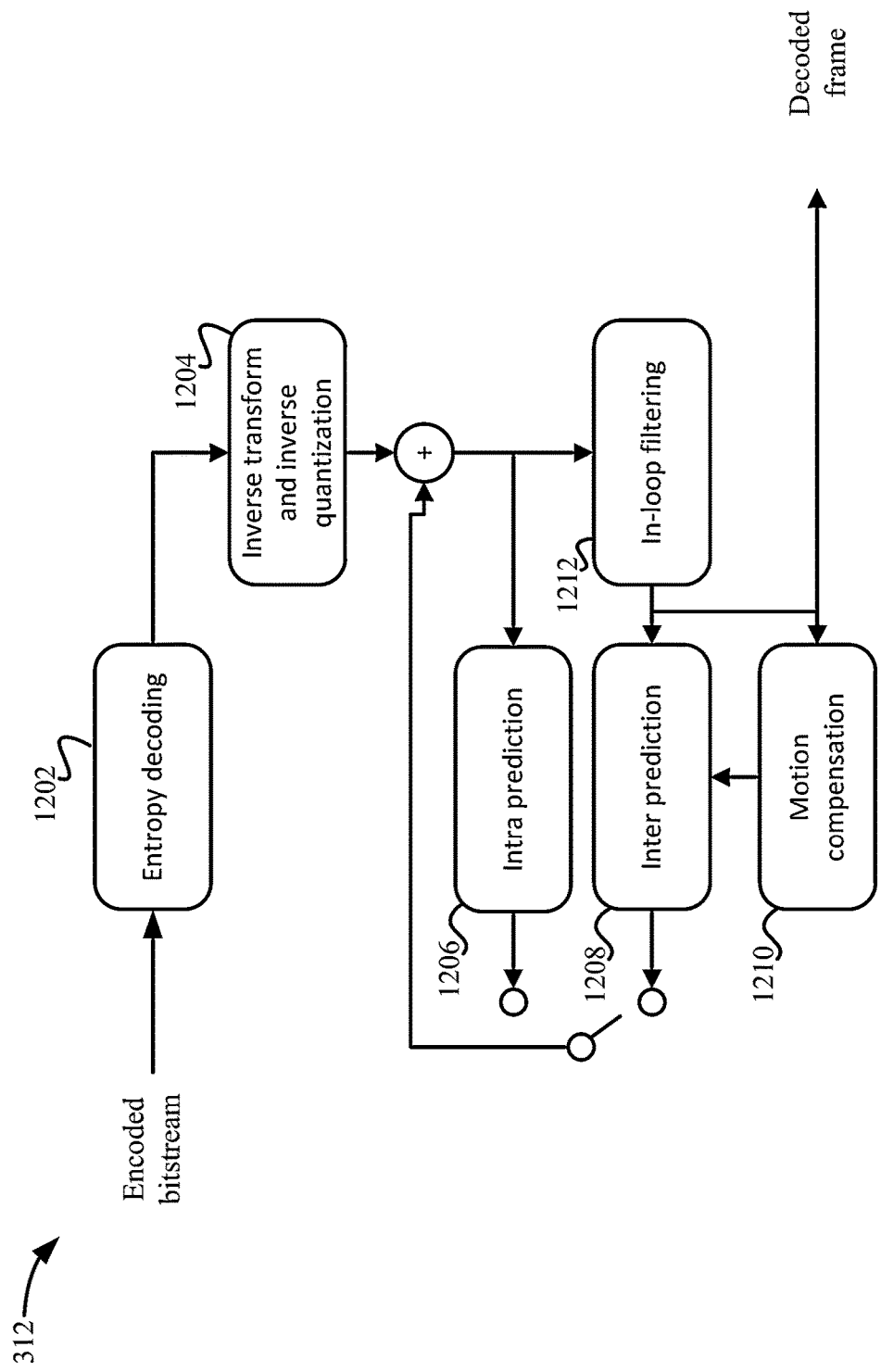
FIG. 12 depicts an example of a decoding system according to some embodiments.

FIG. 12 depicts an example of a decoding system according to some embodiments. Decoder 312 receives the encoded bitstream and inputs it into an entropy decoding block 1202 to recover the information needed for decoding process. As above-mentioned, a decoded frame can be decoded by using an inverse transform and inverse quantization block 1204, an intra prediction block 1206 or inter prediction block 1208, motion compensation block 1210, and in-loop filtering block 1212 in the same way to build a decoded frame.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   transcoding, by a computing device, a first block from a spatial region, the first block associated with a first block tree pattern defining a structure of splitting a block into smaller blocks;
   including, by the computing device, a bit string of bits for the first block tree pattern in an encoded bitstream;
   determining, by the computing device, a location of the first block in the spatial region when the first block tree pattern of the first block can be reused for a second block tree pattern of a second block, wherein the spatial region includes a plurality of blocks and the location is based on the first block being one of the plurality of blocks in the spatial region; and including, by the computing device, information for the second block in the encoded bitstream that indicates the location of the first block in the spatial region without including a bit string of bits for the second block tree pattern, wherein the location allows the bit string of bits for the first block tree pattern to be retrieved for use to decode the second block from the encoded bitstream.

2. The method of claim 1, wherein:
the spatial region comprises a frame of a video, and
the first block and the second block are in the frame.

3. The method of claim 1, wherein:
the spatial region comprises a first frame,
the first block is located in the first frame, and
the second block is located in a second frame.

4. The method of claim 1, wherein:
the spatial region comprises a first layer in a multi-layer video, and
the first block is located in the first layer, and
the second block is located in a second layer in the multi-layer video.

5. The method of claim 4, wherein:
the first layer is part of a sequence of pictures having a first common characteristic, and
the second layer is part of a sequence of pictures having a second common characteristic.

6. The method of claim 4, wherein:
the first layer is part of a first view of multi-view data, and
the second layer is part of a second view of the multi-view data.

7. The method of claim 1, wherein:
the spatial region comprises a first view in a multi-view video,
the first block is located in the first view, and
the second block is located in a second view in the multi-view video.

8. The method of claim 1, wherein:
the plurality of blocks comprises a plurality of root blocks, wherein a root block is split into a set of smaller blocks.

9. The method of claim 1, wherein:
the first block is a first root block, and
the second block is a second root block.

10. The method of claim 1, wherein:
the second block tree pattern defines a same structure of the first block tree pattern.

11. The method of claim 1, further comprising:
determining that the first block tree pattern can be reused for the second block tree pattern.

12. The method of claim 1, further comprising:
searching storage for a similar block tree pattern to the second block tree pattern to determine when the first block tree pattern of the first block can be reused for the second block tree pattern of the second block.

13. An apparatus comprising:
one or more computer processors; and
a non-transitory computer-readable storage medium comprising instructions, that when executed, control the one or more computer processors to be configured for:
transcoding a first block from a spatial region, the first block associated with a first block tree pattern defining a structure of splitting a block into smaller blocks;
including a bit string of bits for the first block tree pattern in an encoded bitstream;
determining a location of the first block in the spatial region when the first block tree pattern of the first block can be reused for a second block tree pattern of a second block, wherein the spatial region includes a plurality of blocks and the location is based on the first block being one of the plurality of blocks in the spatial region; and
including information for the second block in the encoded bitstream that indicates the location of the first block in the spatial region without including a bit string of bits for the second block tree pattern, wherein the location allows the bit string of bits for the first block tree pattern to be retrieved for use to decode the second block from the encoded bitstream.

14. A method comprising:
receiving, by a computing device, an encoded bitstream;
decoding, by the computing device, a first block in a spatial region using a first block tree pattern that defines a structure of splitting the first block into smaller blocks;
selecting, by the computing device, a second block for decoding;
determining, by the computing device, information for the second block in the encoded bitstream that indicates a location of the first block inside the spatial region, wherein the spatial region includes a plurality of blocks and the location is based on the first block being one of the plurality of blocks in the spatial region, and wherein the encoded bitstream does not include a bit string of bits for a second block tree pattern of the second block;
retrieving, by the computing device, the bit string of bits for the first block tree pattern using the location, wherein the first block tree pattern is to be used to decode the second block from the encoded bitstream; and
decoding, by the computing device, the second block using the first block tree pattern.

15. The method of claim 14, wherein:
the spatial region comprises a frame of a video, and
the first block and the second block are in the frame.

16. The method of claim 14, wherein:
the spatial region comprises a first frame,
the first block is located in the first frame, and
the second block is located in a second frame.

17. The method of claim 14, wherein:
the spatial region comprises a first layer in a multi-layer video, and
the first block is located in the first layer, and
the second block is located in a second layer in the multi-layer video.

18. The method of claim 17, wherein:
the first layer is part of a sequence of pictures having a first common characteristic, and
the second layer is part of a sequence of pictures having a second common characteristic.

19. The method of claim 17, wherein:
the first layer is part of a first view of multi-view data, and
the second layer is part of a second view of the multi-view data.

20. The method of claim 14, wherein:
the spatial region comprises a first view in a multi-view video,
the first block is located in the first view, and
the second block is located in a second view in the multi-view video.

\* \* \* \* \*